United States Patent
Limberg

(12) 
(10) Patent No.: US 6,201,564 B1
(45) Date of Patent: Mar. 13, 2001

(54) METHOD OF OPERATING THE CHANNEL EQUALIZER IN A RECEIVER FOR DTV SIGNALS SUBJECT TO CO-CHANNEL NTSC INTERFERENCE

(75) Inventor: Allen LeRoy Limberg, Vienna, VA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/151,209

(22) Filed: Sep. 11, 1998

Related U.S. Application Data

(60) Provisional application No. 60/135,099, filed on Sep. 19, 1997.

(51) Int. Cl.[7] .................................................. H04N 7/00
(52) U.S. Cl. ............................................. 348/21; 348/607
(58) Field of Search .................................. 348/607, 21, 725, 348/726, 614, 470; 375/346, 348, 350

(56) References Cited

U.S. PATENT DOCUMENTS 5,594,496 * 1/1997 Nielsen et al. ...................... 348/21

5,648,822 * 7/1997 Hulyalkar ............................ 348/21

* cited by examiner

Primary Examiner—Victor R. Kostak
(74) Attorney, Agent, or Firm—Robert E. Bushnell, Esq.

(57) ABSTRACT

A DTV signal receiver includes an adaptive channel equalization filter, a comb filter for suppressing artifacts of co-channel NTSC interference, and an intersymbol-interference suppression filter compensating for the intersymbol interference introduced by the comb filter. The adaptation of the equalization filter coefficients is done so as to be insensitive to the presence or absence of the artifacts of co-channel NTSC interference. This avoids the channel equalization filter attempting to compensate for the intersymbol interference introduced by the comb filter, which compensation could not be fully accomplished and would make the intersymbol interference in the comb filter unpredictable. The adaptation of the equalization filter coefficients is done so as not to affect the intersymbol interference introduced by the comb filter. Consequently, the intersymbol interference can be properly compensated for by the intersymbol-interference suppression filter.

14 Claims, 8 Drawing Sheets

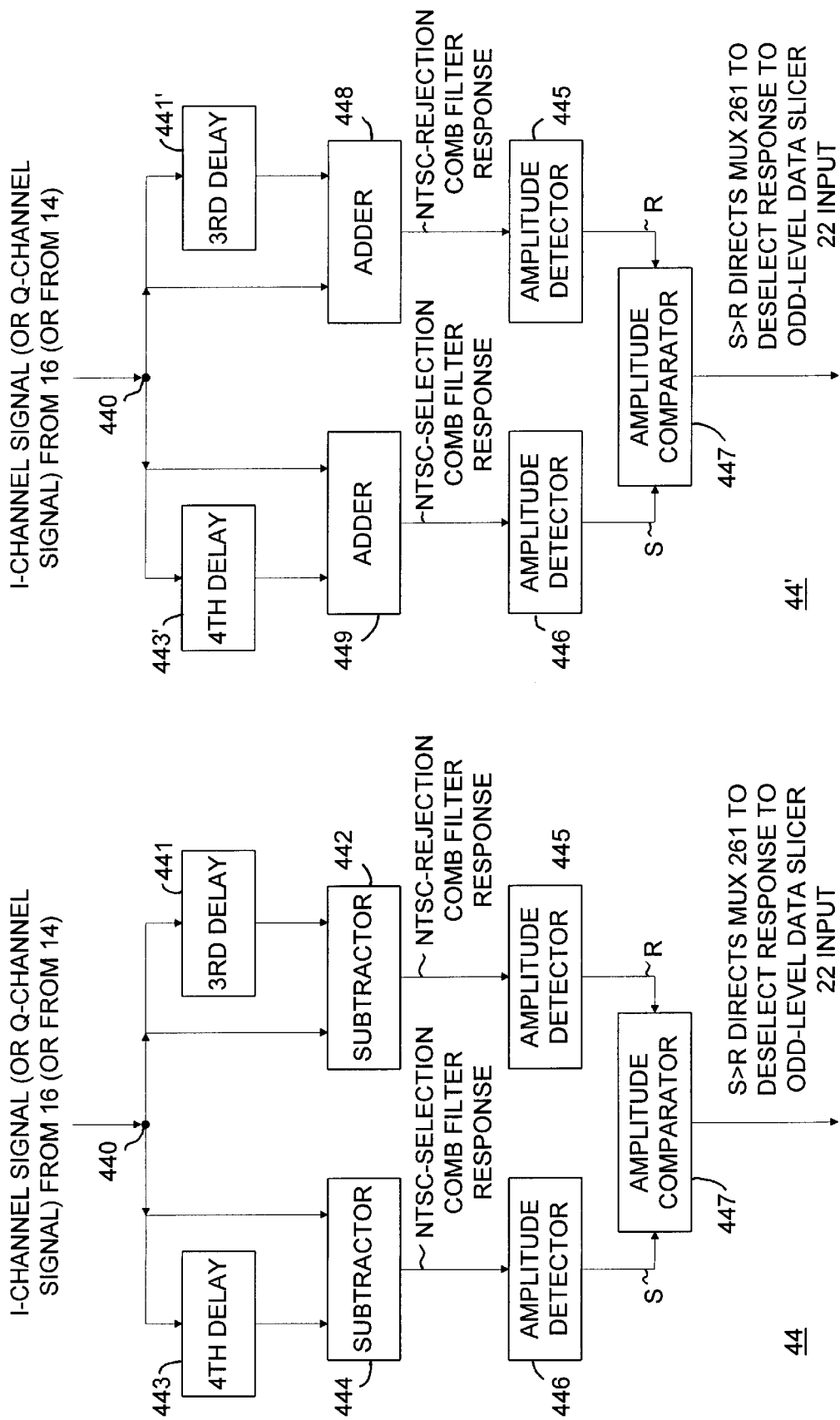

METHOD OF OPERATING THE CHANNEL EQUALIZER IN A RECEIVER FOR DTV SIGNALS SUBJECT TO CO-CHANNEL NTSC INTERFERENCE

This is a complete application filed under 35 U.S.C. 111(a) claiming, pursuant to 35 U.S.C. 119(e)(1), benefit of the filing date of provisional U.S. patent application Ser. No. 60/135,099 filed Sep. 19, 1997.

The present invention relates to digital television systems, and more particularly, to a method for adjusting channel equalization circuitry in a receiver for digital television signals broadcast through the air using the same channels that NTSC analog television signals are broadcast over.

BACKGROUND OF THE INVENTION

A Digital Television Standard published Sep. 16, 1995 by the Advanced Television Systems Committee (ATSC) specifies vestigial sideband (VSB) signals for transmitting digital television (DTV) signals in 6-MHz-bandwidth television channels. DTV signals will be transmitted in certain of the ultra-high-frequency transmission channels currently used in over-the-air broadcasting of National Television System Committee (NTSC) analog television signals within the United States. The VSB DTV signal is designed so its spectrum is likely to interleave with the spectrum of a co-channel interfering NTSC analog TV signal. The symbol frequency of the DTV signal is three times NTSC color subcarrier frequency, which 3.58 MHz subcarrier frequency is 455/2 times NTSC scan line rate. The pilot carrier and the principal amplitude-modulation sideband frequencies of the DTV signal are positioned at odd multiples of one-quarter the horizontal scan line rate of the NTSC analog TV signal. This causes these DTV signal components to fall between the even multiples of one-quarter the horizontal scan line rate of the NTSC analog TV signal, at which even multiples most of the energy of the luminance and chrominance components of a co-channel interfering NTSC analog TV signal will fall. The video carrier of an NTSC analog TV signal is offset 1.25 MHz from the lower limit frequency of the television channel. The carrier of the DTV signal can be offset from such video carrier by 59.75 times the horizontal scan line rate of the NTSC analog TV signal, to place the carrier of the DTV signal about 309,877.6 kHz from the lower limit frequency of the television channel. Accordingly, the carrier of the DTV signal is about 2,690122.4 Hz from the middle frequency of the television channel.

The exact symbol rate in the Digital Television Standard is (684/286) times the 4.5 MHz sound carrier offset from video carrier in an NTSC analog TV signal. The number of symbols per horizontal scan line in an NTSC analog TV signal is 684, and 286 is the factor by which NTSC horizontal scan line rate is multiplied to obtain the 4.5 MHz sound carrier offset from video carrier in an NTSC analog TV signal. The symbol rate is 10.762238 million symbols per second, which can be contained in a VSB signal extending 5.381119 MHz from DTV signal carrier. That is, the VSB signal can be limited to a band extending 5.690997 MHz from the lower limit frequency of the television channel.

The ATSC standard for DTV signal terrestrial broadcasting in the United States of America is capable of transmitting either of two high-definition television (HDTV) formats with 16:9 aspect ratio. One HDTV display format uses 1920 samples per scan line and 1080 active horizontal scan lines per 30 Hz frame with 2:1 field interlace. The other HDTV display format uses 1280 luminance samples per scan line and 720 progressively scanned scan lines of television image per 60 Hz frame. The ATSC standard also accommodates the transmission of DTV display formats other than HDTV display formats, such as the parallel transmission of four television signals having normal definition in comparison to an NTSC analog television signal.

DTV transmitted by vestigial-sideband (VSB) amplitude modulation (AM) during terrestrial broadcasting in the United States of America comprises a succession of consecutive-in-time data fields each containing 313 consecutive-in-time data segments. One may consider the data fields to be consecutively numbered modulo-2, with each odd-numbered data field and the succeeding even-numbered data field forming a data frame. The frame rate is 20.66 frames per second. Each data segment is of 77.3 microseconds duration. So, with the symbol rate being 10.76 MHz, there are 832 symbols per data segment. Each segment of data begins with a data-segment-synchronization (DSS) code group of four symbols having successive values of +S, −S, −S and +S. The value +S is one level below the maximum positive data excursion, and the value −S is one level above the maximum negative data excursion. The initial data segment of each data field includes a data-field-synchronization (DFS) code group that codes a training signal for channel-equalization and multipath suppression procedures. The training signal is a 511-sample pseudo-noise sequence (or "PN-sequence") followed by three 63-sample PN sequences. The middle ones of the 63-sample PN sequences in the DFS codes are transmitted in accordance with a first logic convention in the first line of each odd-numbered data field and in accordance with a second logic convention in the first line of each even-numbered data field. The first and second logic conventions are complementary to each other (i. e., of opposite senses of polarity).

The data within data segments are trellis coded using twelve interleaved trellis codes, each a ⅔ rate trellis code with one uncoded bit that is precoded. The interleaved trellis codes are subjected to Reed-Solomon forward error-correction coding, which provides for correction of burst errors arising from noise sources such as a nearby unshielded automobile ignition system. The Reed-Solomon coding results are transmitted as 8-level (3 bits/symbol) one-dimensional-constellation symbol coding for over-the-air transmission. The Reed-Solomon coding results are transmitted as 16-level (4 bits/symbol) one-dimensional-constellation symbol coding for cablecast, which transmissions are made without any preceding after symbol generation. The VSB signals have their natural carrier wave, which would vary in amplitude depending on the percentage of modulation, suppressed.

The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 4-bit symbol coding have normalized values of −7, −5, −3, −1, +1, +3, +5 and +7 in the carrier modulating signal, the pilot carrier has a normalized value of 1.25. The normalized value of +S is +5, and the normalized value of −S is −5.

Receivers for VSB DTV signals are known that employ a comb filter for suppressing artifacts of co-channel NTSC interference accompanying baseband symbol coding and an intersymbol-interference suppression filter compensating for the intersymbol interference introduced by the comb filter. U.S. Pat. No. 5,087,975 issued Feb. 11, 1992 to R. W. Citta et alii and entitled "VSB HDTV TRANSMISSION SYSTEM WITH REDUCED NTSC CO-CHANNEL INTERFERENCE" concerns such a receiver. So does U.S. Pat. No. 5,748,226 issued May 5, 1998 to A. L. R. Limberg and entitled "DIGITAL TELEVISION RECEIVER WITH ADAPTIVE FILTER CIRCUITRY FOR SUPPRESSING NTSC CO-CHANNEL INTERFERENCE". FIG. 16 of the drawing of U.S. Pat. No. 5,087,975 shows the ISI-suppression filter to compensate for the precoding effects of the NTSC-rejection comb filter being located between the NTSC-rejection comb filter and the data slicer. FIG. 1 of the drawing of U.S. Pat. No. 5,748,226 shows the ISI-suppression filter to compensate for the preceding effects of the NTSC-rejection comb filter being located after the NTSC-rejection comb filter and the data slicer.

The artifacts of co-channel NTSC interference arise during the synchronous detection of the digital television signal to recover baseband symbol coding. The artifacts of the video carrier of a co-channel interfering NTSC color TV signal are at 59.75 $f_H$, $f_H$ being the horizontal scan frequency of the NTSC signal. The artifact of the color subcarrier is at 287.25 $f_H$, and the artifact of the unmodulated NTSC audio carrier is at 345.75 $f_H$.

The ISI-suppression filter is a comb filter designed for matching the NTSC-rejection comb filter to cancel the intersymbol interference introduced by NTSC-rejection comb filter. The proper operation of the ISI-suppression filter depends on the intersymbol interference being of known nature. DTV signal receivers commonly include an adaptive channel equalization filter, designed to provide match-filtering for suppressing intersymbol interference arising in the transmission channel up to and including the demodulator used to recover baseband symbol coding. The filter coefficients of the adaptive channel equalization filter are commonly initialized by the training signal method, using a training signal extracted from the data field synchronizing (DFS) signals in the initial data segments of data fields. Artifacts of co-channel NTSC interference that accompany the DFS signals affect the filter coefficients of the adaptive channel equalization filter and attempt to reduce their presence. This adversely affects the match-filtering to the transmission channel that the adaptive channel equalization filter is supposed to do. So, the NTSC-rejection comb filter response is no longer match-filtered by the comb filter designed to suppress the intersymbol interference introduced by NTSC-rejection comb filter. Unsuppressed intersymbol interference accordingly raises the bit error rate associated with the conversion of baseband symbol code to error-correction-coded data, which increase in bit error rate is undesirable.

The objective of the invention is to avoid the initialization of the filter coefficients of the adaptive channel equalization filter in response to training signal being affected by artifacts of co-channel NTSC interference that accompany the DFS signals.

SUMMARY OF THE INVENTION

The invention is embodied in a method of operating a channel equalizer in a receiver for digital television signals subject to co-channel interference from analog television signals. A digital television signal is demodulated to generate a baseband symbol code signal accompanied at times by artifacts of interference from a co-channel analog television signal. The baseband symbol code signal is symbol decoded after comb filtering the baseband symbol code signal for suppressing artifacts of interference from the co-channel analog television signal. The baseband symbol code signal is also subjected to channel equalization filtering before symbol decoding thereof. The channel equalization filtering conforms the overall channel response resulting from said steps of comb filtering and channel equalization filtering to the comb-filter response to a match-filtered transmission channel.

A further aspect of the invention is a receiver for digital television signals subject to co-channel interference from analog television signals, which receiver is operated in accordance with this invention. The receiver includes demodulator apparatus that responds to a received digital television signal for supplying a digitized baseband demodulator response comprising symbol coding accompanied by demodulation artifacts of any co-channel interference from an analog television signal. A cascade filter connection is included in the receiver for supplying a cascade filter response to the digitized baseband demodulator response. An adaptive channel equalization filter provided with adjustable filtering coefficients is included in the cascade filter connection together with a comb filter for suppressing the demodulation artifacts of interference from a co-channel analog television signal. The receiver includes a symbol decoder for supplying data responsive to the cascade filter response and an intersymbol-interference suppression filter for processing the data to compensate for the intersymbol interference introduced by the comb filter. The receiver includes apparatus for extracting a received training signal from the cascade filter response during times data field synchronizing signals occur in the digital television signals. A computer is included in the receiver and calculates the terms of a discrete Fourier transform of that training signal. The computer generates a discrete Fourier transform characterizing the channel by dividing those terms by corresponding terms of a discrete Fourier transform of a comb-filtered and match-filtered response to ghost-free training signal as stored in memory for the computer. The computer calculates the adjustable filtering coefficients of the adaptive channel equalization filter so as to complement the channel characterization.

In further aspects of the invention the receiver includes a detector for determining whether or not there is significant interference from a co-channel analog television signal. When there is not significant interference from a co-channel analog television signal, the computer still calculates the terms of a discrete Fourier transform of that training signal. The computer generates a discrete Fourier transform characterizing the channel by dividing those terms, however, by corresponding terms of a discrete Fourier transform of a match-filtered, but not comb-filtered, response to ghost-free training signal as stored in memory for the computer. The computer calculates the adjustable filtering coefficients of the adaptive channel equalization filter so as to complement the channel characterization.

BRIEF DESCRIPTION OF THE DRAWING

FIGS. 8 and 9 are block diagrams of alternative general forms the co-channel NTSC interference detector of FIGS. 1 and 3 can take.

DETAILED DESCRIPTION OF THE PREFERRED EMBODIMENTS

Figure 1:
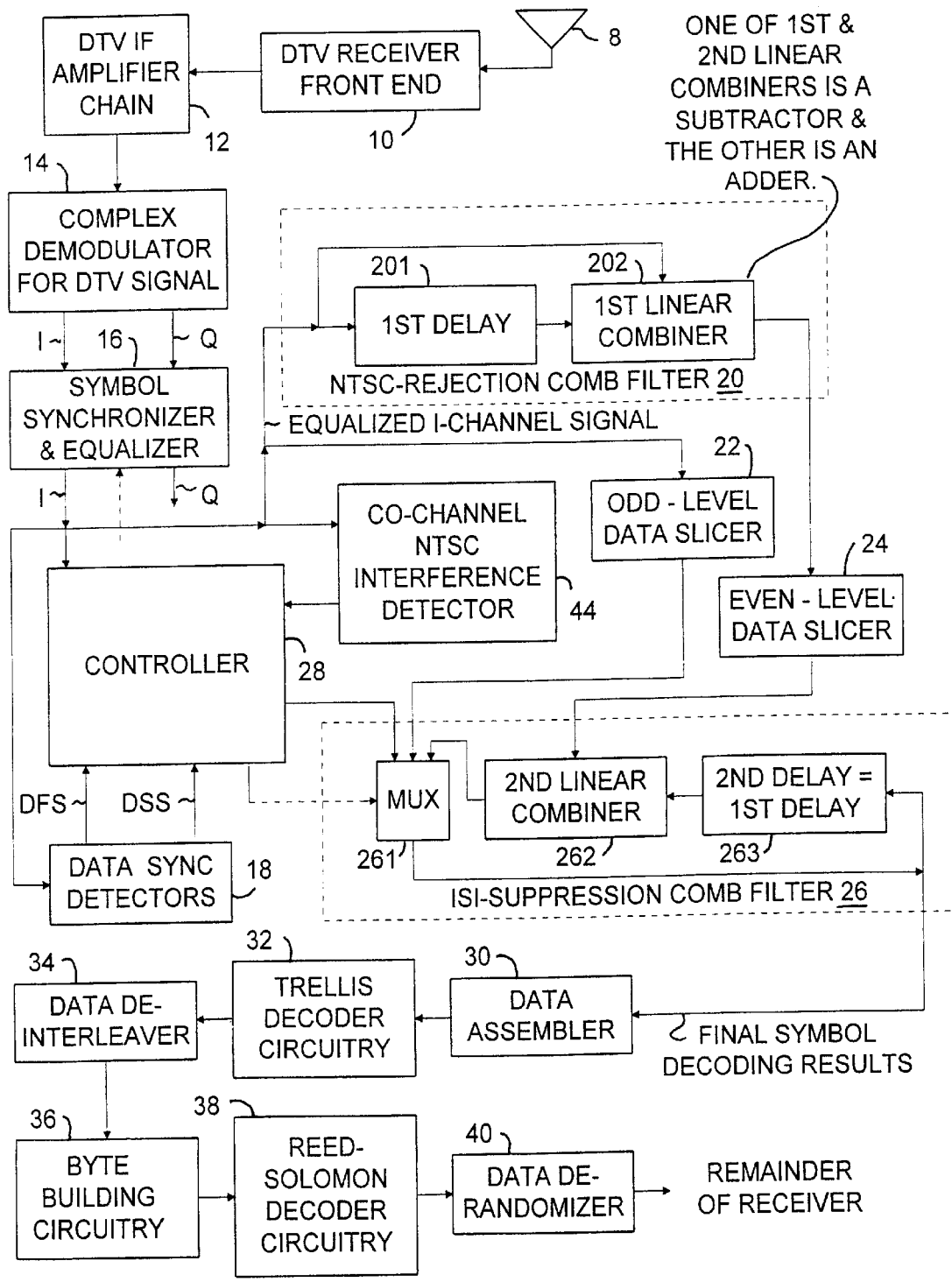
FIG. 1 is a block diagram of a portion of a DTV signal receiver that includes a symbol decoder with co-channel NTSC interference-suppression circuitry selectively activated in accordance with an aspect of the invention, which NTSC interference-suppression circuitry includes a co-channel NTSC interference detector responsive to baseband I-channel signals.

At various points in the circuits shown in the FIGS. 1, 3, 7, 8 and 9 of the drawing, shimming delays may have to be inserted in order that the sequence of operation is correct, as will be understood by those skilled in electronic design. Unless there is something out of the ordinary about a particular shimming delay requirement, it will not be explicitly referred to in the specification that follows.

FIG. 1 shows a digital television signal receiver used for recovering error-corrected data, which data are suitable for recording by a digital video cassette recorder (DVCR) or for MPEG-2 decoding and display in a television set. The FIG. 1 DTV signal receiver is shown as receiving television broadcast signals from a receiving antenna 8, but can receive the signals from a cable network instead. The television broadcast signals are supplied as input signal to "front end" electronics 10. The "front end" electronics 10 generally include a radio-frequency amplifier and first detector for converting radio-frequency television signals to intermediate-frequency television signals, supplied as input signal to an intermediate-frequency (IF) amplifier chain 12 for vestigial-sideband DTV signals. The DTV signal receiver is preferably of plural-conversion type with the IF amplifier chain 12 including an IF amplifier for amplifying DTV signals as converted to an ultra-high-frequency band by the first detector, a second detector for converting the amplified DTV signals to a very-high-frequency band, and a further IF amplifier for amplifying DTV signals as converted to the VHF band. If demodulation to baseband is performed in the digital regime, the IF amplifier chain 12 will further include a third detector for converting the amplified DTV signals to a final intermediate-frequency band closer to baseband.

Preferably, a surface-acoustic-wave (SAW) filter is used in the IF amplifier for the UHF band, to shape channel selection response and reject adjacent channels. This SAW filter cuts off rapidly just beyond 5.38 MHz remove from the suppressed carrier frequency of the VSB DTV signal and the pilot carrier, which is of like frequency and of fixed amplitude. This SAW filter accordingly rejects much of the frequency-modulated sound carrier of any co-channel interfering analog TV signal. Removing the FM sound carrier of any co-channel interfering analog TV signal in the IF amplifier chain 12 prevents artifacts of that carrier being generated when the final I-F signal is detected to recover baseband symbols and forestalls such artifacts interfering with data-slicing of those baseband symbols during symbol decoding. The prevention of such artifacts interfering with data-slicing of those baseband symbols during symbol decoding is better than can be accomplished by relying on comb-filtering before data-slicing, particularly if the differential delay in the comb filter is more than a few symbol epochs.

The final IF output signals from the IF amplifier chain 12 are supplied to a complex demodulator 14, which demodulates the vestigial-sideband amplitude-modulation DTV signal in the final intermediate-frequency band to recover a real baseband signal and an imaginary baseband signal. Demodulation may be done in the digital regime after analog-to-digital conversion of a final intermediate-frequency band in the few-megahertz range as described in U.S. Pat. No. 5,479,449, for example. Alternatively, demodulation may be done in the analog regime, in which case the results are usually subjected to analog-to-digital conversion to facilitate further processing. The complex demodulation is preferably done by in-phase (I) synchronous demodulation and quadrature-phase (Q) synchronous demodulation. The digital results of the foregoing demodulation procedures conventionally have 8-bit accuracy or more and describe 2N-level symbols that encode N bits of data. Currently, 2N is eight in the case where the FIG. 1 DTV signal receiver receives a through-the-air broadcast via the antenna 12 and is sixteen in the case where the FIG. 1 DTV signal receiver receives cablecast. The concern of the invention is with the reception of terrestrial through-the-air broadcasts, and FIG. 1 does not show the portions of the DTV signal receiver providing symbol decoding and error-correction decoding for received cablecast transmissions.

Symbol synchronization and equalization circuitry 16 receives at least the digitized real samples of the in-phase (I-channel) baseband signal from the complex demodulator 14; in the FIG. 1 DTV signal receiver the circuitry 16 is shown also receiving the digitized imaginary samples of the quadrature-phase (Q-channel) baseband signal. The circuitry 16 includes a digital filter with adjustable weighting coefficients that compensates for ghosts and tilt in the received signal. The symbol synchronization and equalization circuitry 16 provides symbol synchronization or "de-rotation" as well as amplitude equalization and ghost removal. Symbol synchronization and equalization circuitry in which symbol synchronization is accomplished before amplitude equalization is known from U.S. Pat. No. 5,479,449. In such designs the demodulator 14 will supply over-sampled demodulator response containing real and imaginary baseband signals to the symbol synchronization and equalization circuitry 16. After symbol synchronization, the over-sampled data are decimated to extract baseband I-channel signal at normal symbol rate, to reduce sample rate through the digital filtering used for amplitude equalization and ghost removal. Symbol synchronization and equalization circuitry in which amplitude equalization precedes symbol synchronization, "de-rotation" or "phase tracking" is also known to those skilled in the art of digital signal receiver design.

Each sample of the circuitry 16 output signal is resolved to ten or more bits and is, in effect, a digital description of an analog symbol exhibiting one of (2N=8) levels. The circuitry 16 output signal is carefully gain-controlled by any one of several known methods, so the ideal step levels for symbols are known. One method of gain control, preferred because the speed of response of such gain control is exceptionally rapid, regulates the direct component of the real baseband signal supplied from the complex demodulator 14 to a normalized level of +1.25. This method of gain control is generally described in U.S. Pat. No. 5,479,449. This method is more specifically described by C. B. Patel et alii in U.S. Pat. No. 5,573,454 issued Jun. 3, 1997, entitled "AUTOMATIC GAIN CONTROL OF RADIO RECEIVER FOR RECEIVING DIGITAL HIGH-DEFINITION TELEVISION SIGNALS", and incorporated herein by reference.

The output signal from the circuitry 16 is supplied as input signal to data sync detection circuitry 18, which recovers data-field-synchronization information DFS and data-segment-synchronization information DSS from the equalized baseband I-channel signal. Alternatively, the input signal to data sync detection circuitry 18 can be obtained prior to equalization.

The equalized I-channel signal samples at normal symbol rate supplied as output signal from the circuitry 16 are applied as the input signal to an NTSC-rejection comb filter 20. The comb filter 20 includes a first delay device 201 to generate a pair of differentially delayed streams of the 2N-level symbols and a first linear combiner 202 for linearly combining the differentially delayed symbol streams to generate the comb filter 20 response. As described in U.S. Pat. No. 5,260,793, the first delay device 201 can provide a delay equal to the period of twelve 2N-level symbols, and the first linear combiner 202 can be a subtractor. Each sample of the comb filter 20 output signal is resolved to ten or more bits and is, in effect, a digital description of an analog symbol exhibiting one of (4N−1)=15 levels.

The symbol synchronization and equalization circuitry 16 is presumed be designed to suppress the direct bias component of its input signal (i. e., the direct term of the system function as expressed in digital samples). Each sample of the circuitry 16 output signal applied as comb filter 20 input signal would then be a digital description of an analog symbol exhibiting one of the following normalized levels: −7, −5, −3, −1, +1, +3, +5 and +7. These symbol levels are denominated as "odd" symbol levels and are detected by an odd-level data-slicer 22 to generate interim symbol decoding results of 000, 001, 010, 011, 100, 101, 110 and 111, respectively.

Each sample of the comb filter 20 output signal is, in effect, a digital description of an analog symbol exhibiting one of the following normalized levels: −14, −12, −10, −8, −6, −4, −2, 0, +2, +4, +6, +8, +10, +12 and +14. These symbol levels are denominated as "even" symbol levels and are detected by an even-level data-slicer 24 to generate comb-filtered symbol decoding results of 001, 010, 011, 100, 101, 110, 111, 000, 001, 010, 011, 100, 101, 110, and 111, respectively.

The data-slicers 22 and 24 can be of the so-called "hard decision" type, as presumed up to this point in the description, or can be of the so-called "soft decision" type used in implementing a Viterbi decoding scheme. Arrangements are possible in which the odd-level data-slicer 22 and the even-level data-slicer 24 are replaced by a single data-slicer, using multiplexer connections to shift its place in circuit and to provide bias to modify its slicing ranges, but these arrangements are not preferred because of the complexity of operation.

The symbol synchronization and equalization circuitry 16 is presumed in the foregoing description to be designed to suppress the direct bias component of its input signal (i. e., the direct term of the system function as expressed in digital samples). This direct bias component has a normalized level of +1.25 and appears in the real baseband signal supplied from the complex demodulator 14 owing to detection of the pilot carrier. In actuality the symbol synchronization and equalization circuitry 16 is designed to preserve the direct bias component of its input signal, at least partially, which simplifies the equalization filter in the circuitry 16 somewhat. Accordingly, the data-slicing levels in the odd-level data-slicer 22 are offset to take into account the direct bias component accompanying the data steps in its input signal. Providing that the first linear combiner 202 is a subtractor, whether the circuitry 16 is designed to suppress or to preserve the direct term of the system function of its input signal has no consequence in regard to the data-slicing levels in the even-level data-slicer 24. However, suppose the differential delay provided by the first delay device 201 is chosen so that the first linear combiner 202 is instead an adder. Then, the data-slicing levels in the even-level data-slicer 24 should be offset to take into account the doubled direct term that accompanies the data steps in its input signal.

An intersymbol-interference suppression comb filter 26 is used after the data-slicers 22 and 24 to generate a filter response in which the intersymbol interference (ISI) introduced by the comb filter 20 is suppressed. The ISI-suppression comb filter 26 includes a 3-input multiplexer 261, a second linear combiner 262, and a second delay device 263 with delay equal to that of the first delay device 201 in the NTSC-rejection comb filter 20. The second linear combiner 262 is a modulo-8 adder if the first linear combiner 202 is a subtractor and is a modulo-8 subtractor if the first linear combiner 202 is an adder. The first linear combiner 202 and the second linear combiner 262 may be constructed as respective read-only memories (ROMs) to speed up linear combination operations sufficiently to support the sample rates involved. The output signal from the multiplexer 261 furnishes the response from the ISI-suppression comb filter 26 and is delayed by the second delay device 263. The second linear combiner 262 combines precoded symbol decoding results from the even-level data-slicer 24 with the output signal from the second delay device 263.

The output signal of the multiplexer 261 reproduces one of the three input signals applied to the multiplexer 261, as selected in response to first, second and third states of a multiplexer control signal supplied to the multiplexer 261 from a controller 28. The first input port of the multiplexer 261 receives ideal symbol decoding results supplied from memory within the controller 28 during times when data-field-synchronization information DFS and data-segment-synchronization information DSS are recovered from the equalized baseband I-channel signal by the data sync detection circuitry 18. The controller 28 supplies the first state of the multiplexer control signal to the multiplexer 261 during these times, conditioning the multiplexer 261 to furnish, as the final coding results which are its output signal, the ideal symbol decoding results supplied from memory within the controller 28. The odd-level data-slicer 22 supplies interim symbol decoding results as its output signal to the second input port of the multiplexer 261. The multiplexer 261 is conditioned by the second state of the multiplexer control signal to reproduce the interim symbol decoding results in the final coding results supplied from the multiplexer 261. The second linear combiner 262 supplies ISI-suppression-filtered symbol decoding results as its output signal to the third input port of the multiplexer 261. The multiplexer 261 is conditioned by the third state of the multiplexer control signal to reproduce the ISI-suppression-filtered symbol decoding results in the final coding results supplied from the multiplexer 261. Running errors in the ISI-suppression-filtered symbol decoding results from the ISI-suppression comb filter 26 are curtailed by feeding back the ideal symbol decoding results supplied from memory within the controller 28 during times data sync detection circuitry 18 recovers DSS or DFS synchronization information.

The output signal from the multiplexer 261 in the ISI-suppression comb filter 26 comprises the final symbol decoding results in 3-parallel-bit groups, assembled by a data assembler 30 for application to trellis decoder circuitry 32. Trellis decoder circuitry 32 conventionally uses twelve trellis decoders. The trellis decoding results are supplied from the trellis decoder circuitry 32 to data de-interleaver circuitry 34 for de-commutation. Byte parsing circuitry 36 converts the data de-interleaver circuitry 34 output signal into bytes of Reed-Solomon error-correction-coded data for application to Reed-Solomon decoder circuitry 38, which performs Reed-Solomon decoding to generate an error-corrected byte stream supplied to a data de-randomizer 40. The data de-randomizer 40 supplies reproduced data to the remainder of the receiver (not shown). The remainder of a complete DTV signal receiver will include a packet sorter, an audio decoder, an MPEG-2 decoder and so forth. The remainder of a DTV signal receiver incorporated in a digital tape recorder/reproducer will include circuitry for converting the data to a form for recording.

A co-channel NTSC interference detector 44 that is insensitive to the direct bias component of its input signal is used for detecting the strength of the artifacts arising from co-channel NTSC interference in that input signal. The detector 44 input signal is the baseband I-channel signal in the FIG. 1 DTV signal receiver. The co-channel NTSC interference detector 44 supplies the controller 28 with an indication of whether co-channel NTSC interference is of sufficient strength as to cause uncorrectable error in the data-slicing performed by the data-slicer 22. If detector 44 indicates the co-channel NTSC interference is not of such strength, the controller 28 will supply the second state of multiplexer control signal to the multiplexer 261 most of the time. The only times this is not the case are those times when data-field-synchronization information DFS or data-segment-synchronization information DSS is recovered by the data sync detection circuitry 18, causing the controller 28 to apply the first state of multiplexer control signal to the multiplexer 261. The multiplexer 261 is conditioned by the second state of its multiplexer control signal to reproduce as its output signal the interim symbol decoding results supplied from the odd-level data-slicer 22.

If detector 44 indicates the co-channel NTSC interference is of sufficient strength to cause uncorrectable error in the data-slicing performed by the data-slicer 22, the controller 28 will supply the third state of multiplexer control signal to the multiplexer 261 most of the time. The only times this is not the case are those times when data-field-synchronization information DFS or data-segment-synchronization information DSS is recovered by the data sync detection circuitry 18, causing the controller 28 to apply the first state of multiplexer control signal to the multiplexer 261. The multiplexer 261 is conditioned by the third state of its multiplexer control signal to reproduce as its output signal the ISI-suppression-filtered symbol decoding results provided as second linear combining results from the second linear combiner 262.

Figure 2:
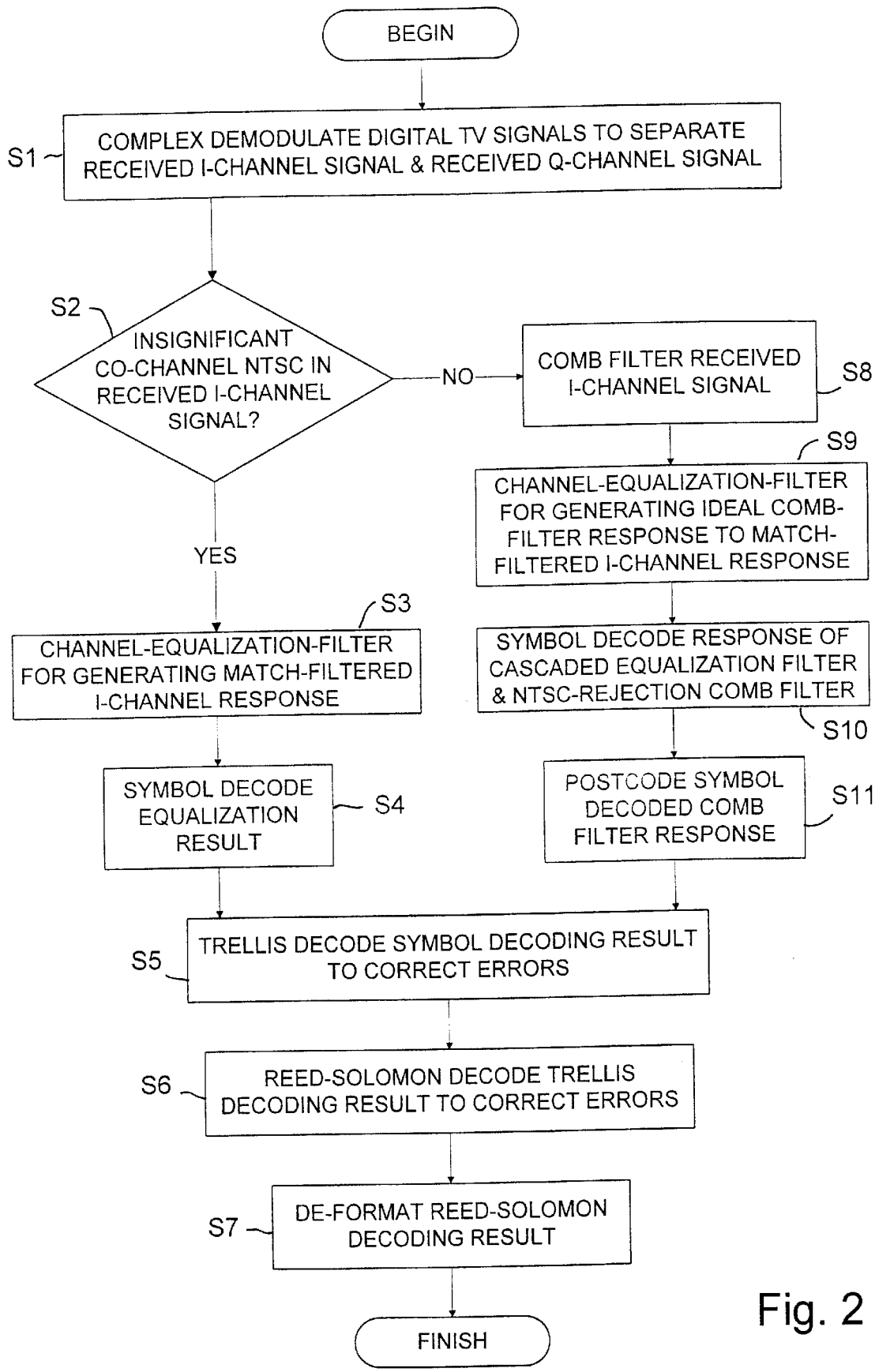
FIG. 2 is a flow chart of operation in a portion of the FIG. 1 digital television receiver showing how equalization procedures are modified depending on whether or not comb filtering to suppress co-channel NTSC interference is employed.

FIG. 2 is a flow chart showing how equalization procedures are modified in the FIG. 1 DTV signal receiver depending on whether or not comb filtering to suppress co-channel NTSC interference is employed. The inventor points out that the presence of the artifacts of co-channel NTSC interference in the baseband symbol coding introduces errors into the calculation of equalization filter kernel coefficients unless special measures are taken in the calculations to negate these artifacts.

In an initial step S1, a complex demodulation of digital television signals is continuously performed by the complex demodulator 14 in the FIG. 1 DTV signal receiver, to separate a received I-channel baseband signal and a received Q-channel baseband signal in an orthogonal relationship with the received I-channel baseband signal. In a decision step S2, which is also continuously performed by the NTSC co-channel interference detector 44 in the FIG. 1 DTV signal receiver, it is determined whether or not a significant amount of co-channel NTSC interference accompanies the received I-channel baseband signal.

A significant amount of co-channel NTSC interference in a DTV signal receiver is that level which causes the number of errors incurred during trellis decoding to significantly exceed the error correcting capabilities of the two-dimensional Reed-Solomon decoding that follows trellis decoding. A substantial number of bit errors in the ultimately recovered data occur, under reception conditions in which there is normal background noise. The significant amount of co-channel NTSC interference in a DTV signal receiver of particular design is readily determined by experiments on a prototype thereof.

If in the decision step S2 no significant amount of co-channel NTSC interference is determined to accompany the received I-channel baseband signal, a step S3 of adjusting the kernel weights of a digital equalization filter and a subsequent step S4 of symbol decoding the equalization filter response resulting from the step S3 are performed. The step S3 of adjusting the kernel weights is done so the digital equalization filter provides matched response to the I-channel baseband signal. The step S4 of symbol decoding the equalization filter response generates a symbol decoding result used in a subsequent step S5 of trellis decoding the symbol decoding result to correct errors therein. The step S5 of trellis decoding is followed by a step S6 of Reed-Solomon decoding to correct errors in the result of trellis decoding and a step S7 of deformatting the result of Reed-Solomon decoding.

If in the decision step S2 a significant amount of co-channel NTSC interference is determined to accompany the received I-channel baseband signal, a step S8 of comb filtering the received I-channel baseband signal to generate comb-filtered I-channel baseband signal is performed using a suitable comb filter. In a step S9 channel equalization filtering is done so that the overall channel characteristic provides the ideal comb-filter response to match-filtered I-channel baseband symbol code. That is, the kernel weights of the digital equalization filter are adjusted to conform the response of the cascaded digital equalization filter and comb filter to an ideal response for such filter cascade. A step S10 of symbol decoding the response of such filter cascade is performed and thereafter a step 11 of post-coding the symbol decoding response is performed to obtain corrected symbol decoding result to be used in the step S5 of trellis decoding. The post-coding in step 11 compensates for precoding that results from the comb filtering of step S8 and suppresses the intersymbol interference associated with that preceding. The step S5 of trellis decoding is still followed by the step S6 of Reed-Solomon decoding to correct errors in the result of trellis decoding and the step S7 of deformatting the result of Reed-Solomon decoding.

The submethod used for adjusting the kernel weights of the digital equalization filter in step S3 of equalizing digital equalization filter response is similar to the adjustment of the kernel weights of the digital equalization filter used in the prior art. Adjustment can be made by calculating the discrete Fourier transform (DFT) of the received data field synchronization code or a prescribed portion thereof and dividing it by the DFT of the ideal data field synchronization code or prescribed portion thereof to determine the DFT of the DTV transmission channel. The DFT of the DTV transmission channel is normalized with respect to the largest term(s) to characterize the channel, and the kernel weights of the digital equalization filter are selected to complement the normalized DFT characterizing the channel. This method of adjustment is described in greater detail by C. B. Patel et alii in U.S. Pat. No. 5,331,416 issued Jul. 19, 1994 and entitled "METHODS FOR OPERATING GHOST-CANCELATION CIRCUITRY FOR TV RECEIVER OR VIDEO RECORDER", for example. This method is preferable for initial adjustment of the kernel weights of the digital equalization filter because the initial adjustment is made more rapidly than usually it can be done using adaptive equalization. After initial adjustment of the kernel weights of the digital equalization filter, adaptive equalization methods are preferred. A block LMS method for carrying out adaptive equalization is described by J. Yang et alii in U.S. Pat. No. 5,648,987 issued Jul. 15, 1997 and entitled "RAPID-UPDATE ADAPTIVE CHANNEL-EQUALIZATION FILTERING FOR DIGITAL RADIO RECEIVERS, SUCH AS HDTV RECEIVERS". A continuous LMS method for carrying out adaptive equalization is described by A. L. R. Limberg in U.S. patent application Ser. No. 08/832,674 filed Apr. 4, 1997 and entitled "DYNAMICALLY ADAPTIVE EQUALIZER SYSTEM AND METHOD".

In the step S9 DFT can be used to implement the submethod by which the kernel weights of the digital equalization filter are adjusted to conform the response of the cascaded digital equalization filter and comb filter to an ideal response for such filter cascade. DFT is especially useful when performing rapid initial equalization based on using data-field-synchronization (DFS) code or a prescribed portion thereof as a training signal prior to switching to adaptive equalization. During initialization, the equalization filter coefficients are set to prescribed values so the filter response reproduces its input signal. The discrete Fourier transform (DFT) of the received DFS code or the prescribed portion thereof, as comb filtered by the comb filter 20 for rejecting NTSC artifacts, is calculated. This DFT is then divided by the DFT of the ideal DFS code or the prescribed portion thereof, as so comb filtered, to determine the DFT characterizing the DTV transmission channel. The DFT of the DTV transmission channel is then normalized with respect to the largest term(s) to characterize the channel, and the kernel weights of the digital equalization filter are selected to complement the normalized DFT characterizing the channel. After initial adjustment of the kernel weights of the digital equalization filter, adaptive equalization methods are preferably employed. These adaptive equalization methods differ from those used when artifacts of co-channel NTSC interference are insignificant in that the number of possible valid signal states is doubled, less one, by using the comb filter 20 for rejecting NTSC artifacts.

Figure 3:
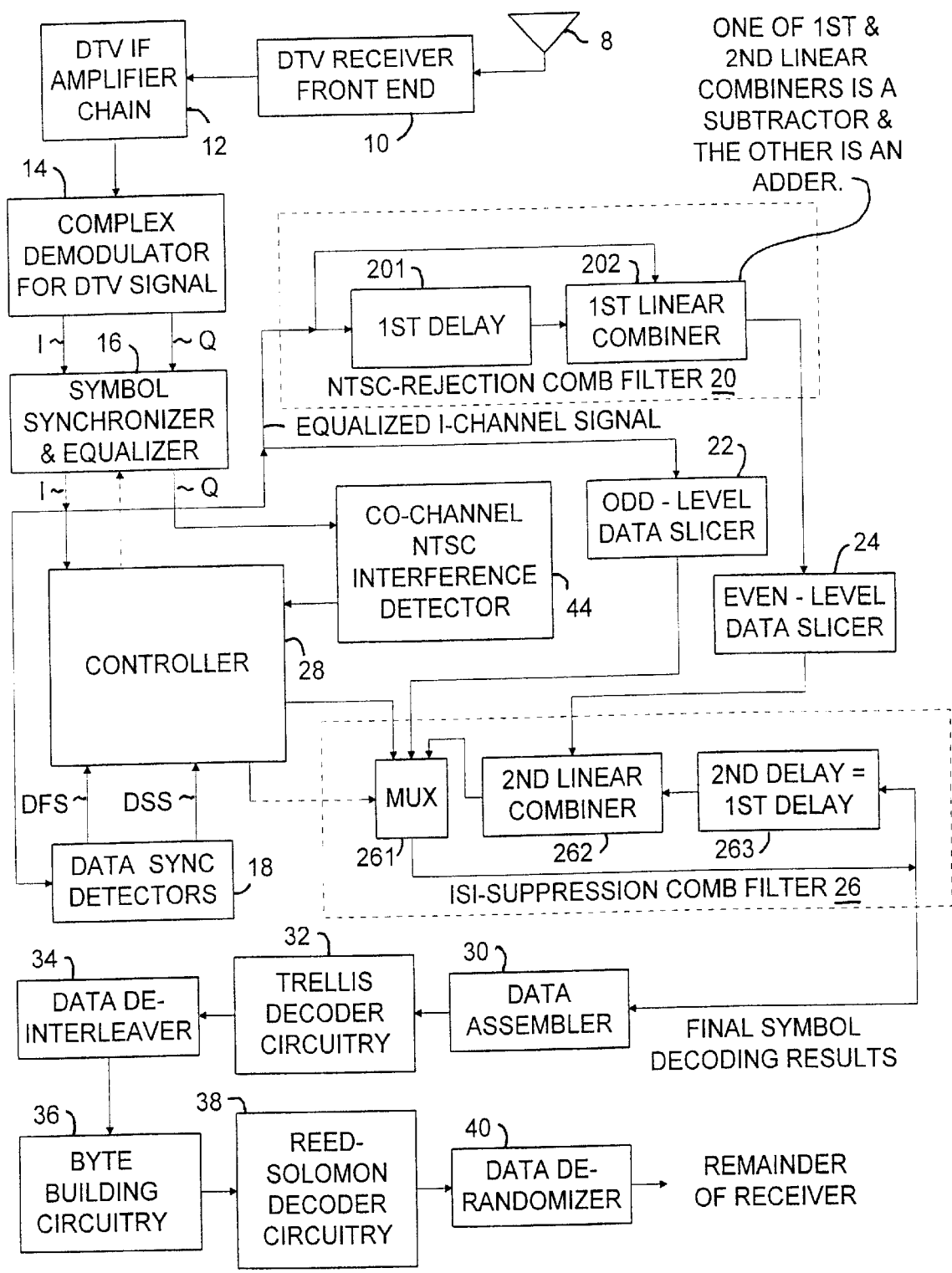
FIG. 3 is a block diagram of a portion of a DTV signal receiver that includes a symbol decoder with co-channel NTSC interference-suppression circuitry selectively activated in accordance with an aspect of the invention, which NTSC interference-suppression circuitry includes a co-channel NTSC interference detector responsive to baseband Q-channel signals.

FIG. 3 shows a DTV signal receiver that differs from the FIG. 1 DTV signal receiver in that baseband Q-channel signal, rather than baseband I-channel signal, is applied to the co-channel NTSC interference detector 44 as its input signal. The co-channel NTSC interference detector 44 is used for detecting the strength of the artifacts arising from co-channel NTSC interference in the baseband Q-channel signal. The detection response of the co-channel NTSC interference detector 44 is insensitive to any direct bias component that may appear in the baseband Q-channel signal during the time that phase-lock of the synchronous detectors in the complex demodulator 14 is still to be established. So there is no switching between baseband signal and comb-filtered baseband signal in calculating weighting coefficients for the equalization filtering in circuitry 16. Any direct bias component that may appear in the baseband Q-channel signal following the DTV signal receiver acquiring a DTV signal (e. g., owing to poor phase-lock during weak signal reception) will not affect the detection response of the co-channel NTSC interference detector 44 either. In the FIG. 3 DTV signal receiver the determination of whether or not a significant amount of co-channel NTSC interference accompanies the received I-channel baseband signal is inferred from the determination of whether or not a significant amount of co-channel NTSC interference accompanies the received Q-channel baseband signal.

Figure 4:
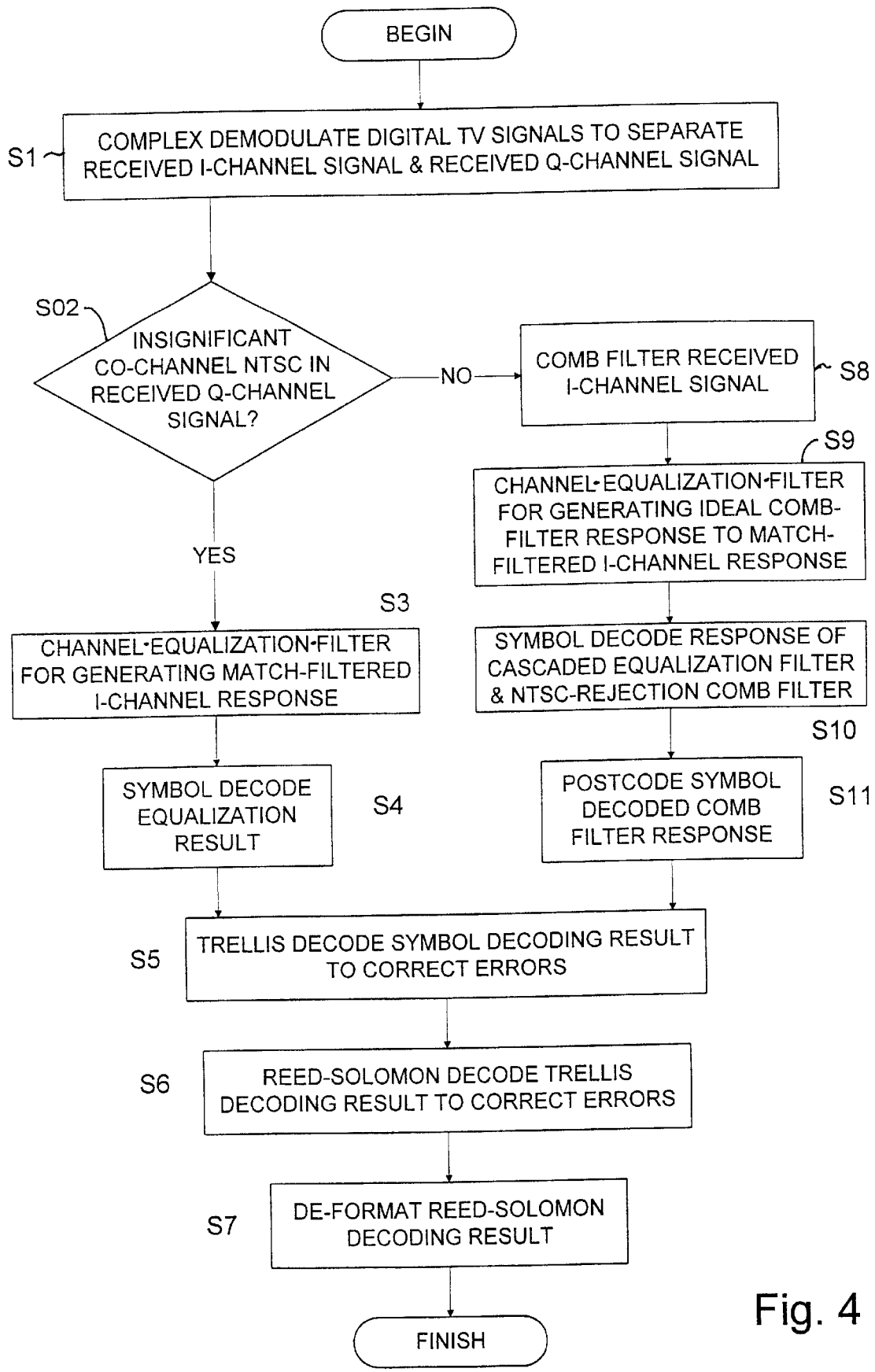
FIG. 4 is a flow chart of operation in a portion of the FIG. 3 digital television receiver showing how equalization procedures are modified depending on whether or not comb filtering to suppress co-channel NTSC interference is employed.

FIG. 4 is a flow chart showing how equalization procedures are modified in the FIG. 3 DTV signal receiver depending on whether or not comb filtering to suppress co-channel NTSC interference is employed. The FIG. 4 flowchart for the FIG. 3 DTV signal receiver differs from the FIG. 2 flowchart for the FIG. 1 DTV signal receiver in that a decision step S02 of determining whether or not a significant amount of co-channel NTSC interference accompanies the received Q-channel baseband signal replaces the decision step S2 of determining whether or not a significant amount of co-channel NTSC interference accompanies the received I-channel baseband signal.

Figure 5:
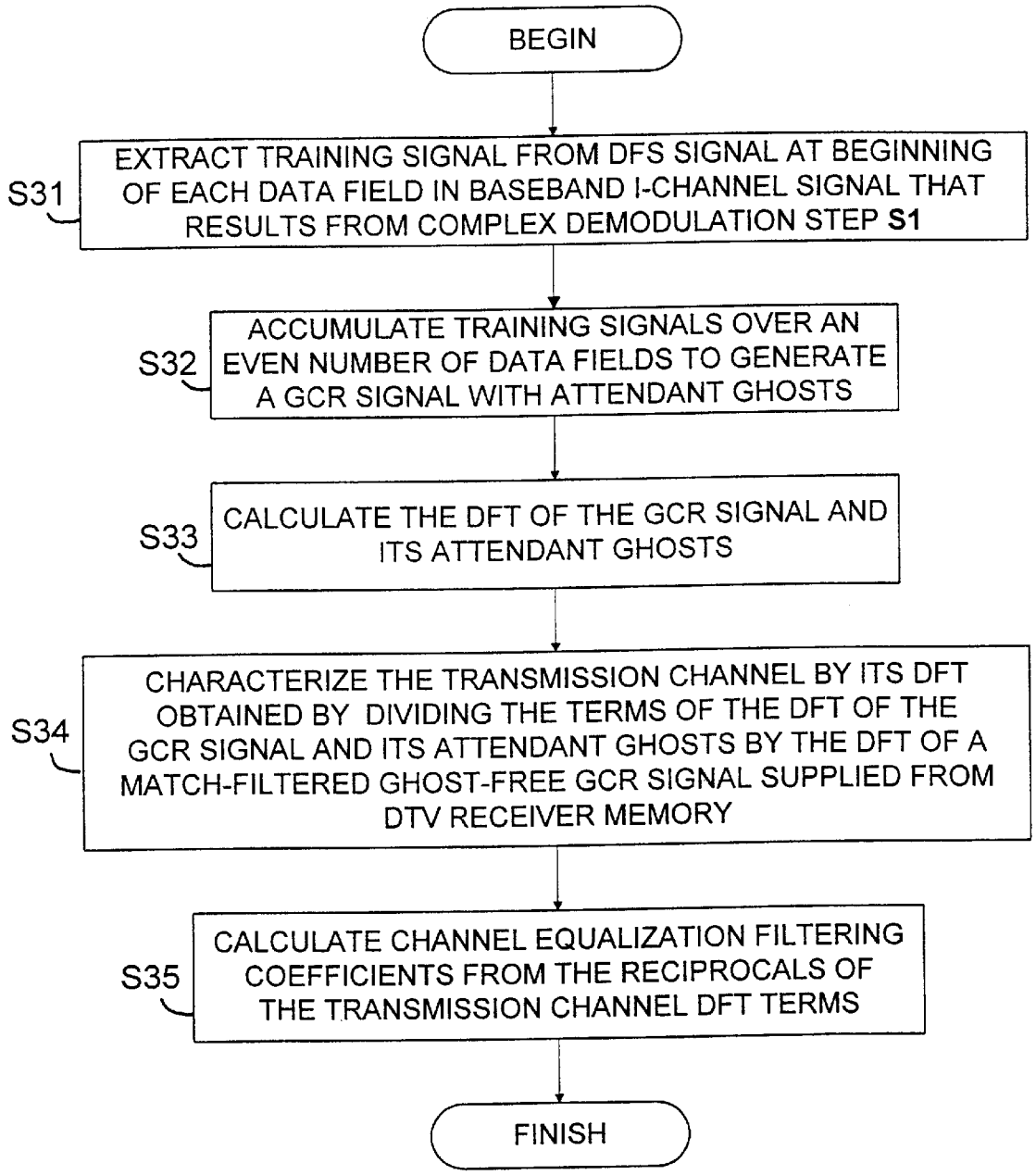
FIG. 5 is a flow chart of a routine used in the FIG. 2 or FIG. 4 method, which routine provides for adjusting the coefficients of the channel equalization filter in response to training signal when comb filtering to suppress co-channel NTSC interference is not employed.

FIG. 5 is a flow chart of the known routine used in the step S3 of equalizing channel response in the FIG. 2 or FIG. 4 method. The step S3 comprises a set of substeps beginning with the substep 31 of extracting training signal from the DFS signal at the beginning of each data field. The DFS signal from which the training signal is extracted is that generated by the complex demodulation step S1. The substep 31 is followed by a substep 32 of accumulating the training signal extracted over a prescribed even number of data fields to generate a received ghost-cancellation reference (GCR) signal with attendant ghosts. If the GCR signal is to be the middle PN63 sequence of the ATSC standard DFS signal the polarity of the DFS signal is alternated with each accumulation step. If the GCR signal is to be the PN511 sequence of the ATSC standard DFS signal the polarity of the DFS signal is kept the same in each accumulation step. A substep S33 of calculating the discrete Fourier transform (DFT) of the received GCR signal with attendant ghosts follows. Then, in a substep S34 of characterizing the transmission channel by a DFT, the DFT of match-filter response to an ideal GCR signal free of attendant ghosts is extracted from memory in the DTV receiver. The terms of the DFT of the received GCR signal with attendant ghosts are then divided in substep S34 by corresponding terms of the DFT of match-filter response to the ideal GCR signal, for generating respective terms of the DFT characterizing the transmission channel. Finally, in a substep S35 coefficients for the channel equalization filtering are calculated for complementing the terms of the DFT characterizing the transmission channel.

Figure 6:
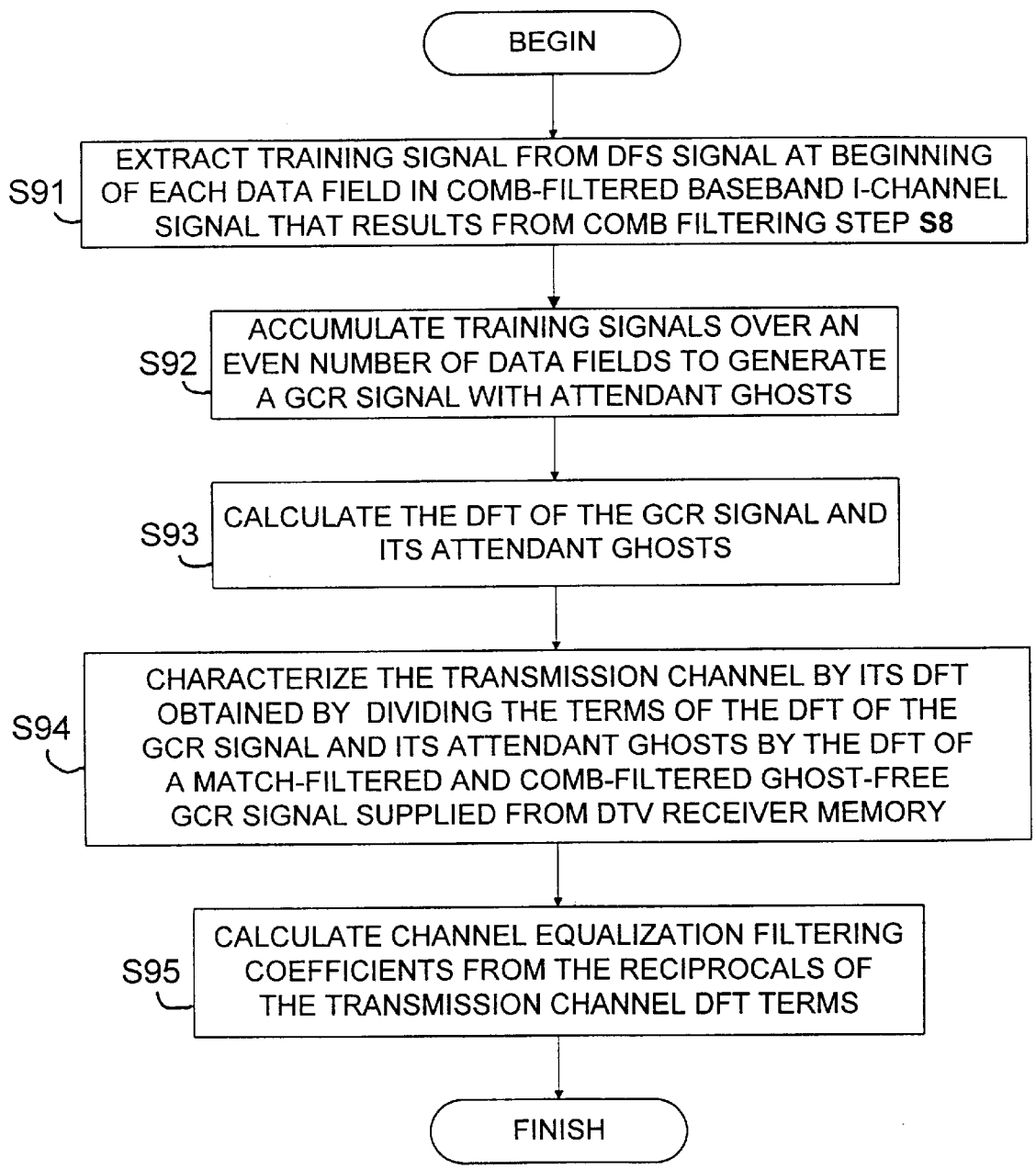
FIG. 6 is a flow chart of a routine used in the FIG. 2 or FIG. 4 method, which routine provides for adjusting the coefficients of the channel equalization filter in response to training signal when comb filtering to suppress co-channel NTSC interference is employed.

FIG. 6 is a flow chart of a modification of the FIG. 5 routine used in the step S3 of equalizing channel response. This modified routine is used in accordance with the invention for performing the step S9 of channel equalization filtering for generating ideal comb-filter response for a match-filtered transmission channel, which ideal comb-filter response is supplied for symbol decoding in step S10. The step S9 comprises a set of substeps beginning with the substep 91 of extracting training signal from the comb-filtered DFS signal at the beginning of each data field. The DFS signal from which the training signal is extracted is that generated by the comb-filtering step S8 rather than the DFS signal resulting directly from the complex demodulation step S1. The substep 91 is followed by a substep 92 of accumulating the training signal extracted over a prescribed even number of data fields to generate a comb-filtered received ghost-cancellation reference (GCR) signal with attendant (comb-filtered) ghosts. If the GCR signal is to be the middle PN63 sequence of the ATSC standard DFS signal the polarity of the DFS signal is alternated with each accumulation step. If the GCR signal is to be the PN511 sequence of the ATSC standard DFS signal the polarity of the DFS signal is kept the same in each accumulation step. A substep S93 of calculating the DFT of the comb filtered GCR signal and attendant ghosts follows. Then, in a substep S94 of characterizing the transmission channel by a DFT, the DFT of comb-filtered match-filter response to an ideal GCR signal free of attendant ghosts is extracted from memory in the DTV receiver. The terms of the DFT of the received GCR signal with attendant ghosts are then divided in substep S94 by corresponding terms of the DFT of comb-filtered match-filter response to the ideal GCR signal, for generating the terms of the DFT characterizing the transmission channel. Finally, in a substep S95 coefficients for the channel equalization filtering are calculated from the reciprocals of the terms of the DFT characterizing the transmission channel.

Figure 7:
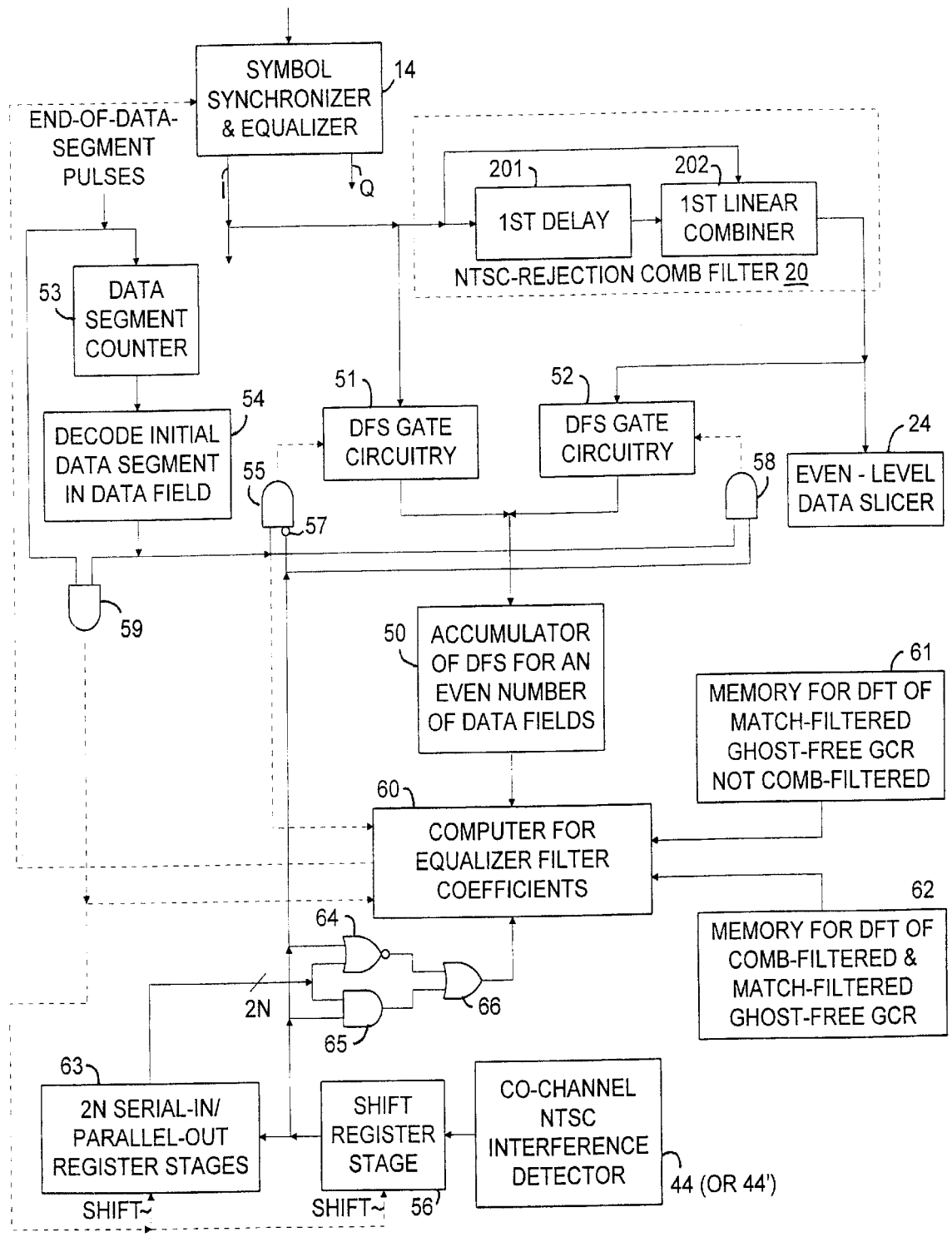
FIG. 7 is a block diagram of details of the portion of a DTV signal receiver shown in FIG. 1 or 3, which details concern circuitry for performing the routines of FIGS. 5 and 6.

FIG. 7 shows details of the circuitry used for performing the routines diagrammed in FIGS. 5 and 6. The GCR signal as received with attendant ghosts is generated by an accumulator 50 for accumulating corresponding symbols of DFS signals in the initial data segments of an even number of data fields. If the GCR signal is to be the middle PN63 sequence of the ATSC standard DFS signal the polarity of the DFS signal is alternated with each accumulation step. If the GCR signal is to be the PN511 sequence of the ATSC standard DFS signal the polarity of the DFS signal is kept the same in each accumulation step.

When the co-channel NTSC interference detector 44 determines that a significant amount of co-channel NTSC interference does not accompany the received I-channel baseband signal, the DFS signal accumulated by the accumulator 50 is extracted from the input signal to the NTSC-rejection comb filter 20 via DFS gate circuitry 51. When the co-channel NTSC interference detector 44 determines that a significant amount of co-channel NTSC interference does not accompany the received I-channel baseband signal, the DFS signal accumulated by the accumulator 50 is extracted from the output signal from the NTSC-rejection comb filter 20 via DFS gate circuitry 52. To facilitate these procedures a data segment counter 53 generates a count indicative of which of the data segments in a group of frames is being received; and a decoder 54 generates responses to this count. The decoder 54 generates a logic ONE output responsive to the count from the counter 53 indicating that the data segment currently being received is the initial data segment of a data field. The decoder 54 generates a logic ZERO output responsive to the count from the counter 53 indicating that the data segment currently being received is a later data segment of a data field.

When the co-channel NTSC interference detector 44 determines that a significant amount of co-channel NTSC interference does not accompany the received I-channel baseband signal it supplies a logic ZERO output signal. A shift register stage 56 responds to this ZERO being supplied at the beginning of the initial segment of a data field to apply a logic ZERO to the input of a logic inverter 55 throughout this initial data segment. The logic inverter 55 responds to this ZERO to supply a logic ONE to a first input connection of a two-input AND gate 57. This ONE conditions the AND gate 57 to respond with a logic ONE when the decoder 54 output signal received at its second input connection is a logic ONE. This occurs responsive to the count from the counter 53 indicating that the data segment currently being received is the initial data segment of a data field. The AND gate 57 output signal being a ONE conditions the DFS gate circuitry 51 to supply the accumulator 50 with DFS signal extracted from the input signal to the NTSC-rejection comb filter 20.

When the co-channel NTSC interference detector 44 determines that a significant amount of co-channel NTSC interference accompanies the received I-channel baseband signal, the detector 44 supplies a logic ONE output signal. The shift register stage 56 responds to this ONE being supplied at the beginning of the initial segment of a data field to apply a logic ONE to the input of the inverter 55 throughout this initial data segment. The inverter 55 responds with a logic ZERO output signal that conditions the AND gate 57 to supply a logic ZERO as its output signal. This ZERO AND gate 57 response conditions the DFS gate circuitry 51 to exhibit a high source impedance, so as not to supply the accumulator 50 with DFS signal extracted from the input signal to the NTSC-rejection comb filter 20. The high source impedance exhibited by the DFS gate circuitry 51 permits the DFS gate circuitry 52 to supply the accumulator 50 with DFS signal extracted from the output signal to the NTSC-rejection comb filter 20.

The output signal from the shift register stage 56 is applied to a first input connection of a two-input AND gate 58. When the shift register stage 56 supplies a logic ONE output signal to the first input connection of the AND gate 58, the AND gate 58 is conditioned to respond with a logic ONE when the decoder 54 output signal received at its second input connection is a logic ONE. This occurs responsive to the count from the counter 53 indicating that the data segment currently being received is the initial data segment of a data field. The AND gate 58 output signal being a ONE conditions the DFS gate circuitry 52 to supply the accumulator 50 with DFS signal extracted from the output signal to the NTSC-rejection comb filter 20.

When the shift register stage 56 supplies a logic ZERO output signal to the first input connection of the AND gate 58, this ZERO conditions the AND gate 58 to supply a logic ZERO as its output signal. The AND gate 58 response conditions the DFS gate circuitry 52 to exhibit a high source impedance, so as not to supply the accumulator 50 with DFS signal extracted from the output signal to the NTSC-rejection comb filter 20. The high source impedance exhibited by the DFS gate circuitry 52 permits the DFS gate circuitry 51 to supply the accumulator 50 with DFS signal extracted from the input signal to the NTSC-rejection comb filter 20.

The shift register stage 56 shifts in response to a shift command that is generated by a two-input AND gate 59 at the beginning of the initial segment of each data field. The AND gate 59 receives the decoder 54 output signal at its first input connection, which signal is a logic ONE during and only during the initial data segment of each data field. The AND gate 59 receives at its second input connection the pulse supplied to the data segment counter 53 at the conclusion of each data segment. This pulse is delivered by a decoder responding to a sample counter, which elements are not explicitly shown in FIG. 7.

After the accumulator 50 has generated an update of the received GCR signal with attendant ghosts, this update is loaded to a first input register of a small computer 60 included within the DTV signal receiver. The computer 60 is programmed for computing the DFT of the received GCR signal and its attendant ghosts. The computer 60 receives over an input line the output signal from the decoder 54 that indicates when the initial data segment of a data field is currently being received. The computer 60 receives over another input line shift commands generated by the AND gate 59. The computer 60 receives sample clocking information, of course, although such connection is not explicitly shown in FIG. 7. FIG. 7 shows memory 61 for supplying the computer 60, when requested, the DFT of match-filtered ghost-free GCR signal that is not comb-filtered, which DFT is used for characterizing the transmission channel when co-channel NTSC interference is determined not to be significant. FIG. 7 further shows memory 62 for supplying the computer 60, when requested, the DFT of match-filtered and comb-filtered ghost-free GCR signal, which DFT is used for characterizing the transmission channel when co-channel NTSC interference is determined to be significant. The memories 61 and 62 can conveniently be realized in a single read-only memory (ROM) addressed by sample count and by an extra bit indicative of which DFT is being requested.

In order for the received GCR signal with attendant ghosts generated by the accumulator 50 to be useful, it must have been acquired by accumulation of initial data segments over a even integral number (2N) of consecutive data fields of a same specific nature. Co-channel NTSC interference must have been determined either not to have been significant in any of the 2N consecutive fields last occurring or to have been significant in all of these 2N consecutive fields. FIG. 7 shows circuitry for deciding whether or not the received GCR signal with attendant ghosts generated by the accumulator 50 is useful. This circuitry comprises the shift register stage 56, a plurality 63 (2N–1) in number of additional serial-in/parallel-out shift register stages, a 2N-input NOR gate 64, a 2N-input AND gate 65 and a 2-input OR gate 66.

The NOR gate 64 receives the contents of the shift register stage 56 and each of the plurality 63 of additional SIPO shift register stages as respective input signals. The NOR gate 64 supplies a logic ONE output signal as first input signal to the OR gate 66 when and only when co-channel NTSC interference has been determined not to be significant in any of the most recent 2N consecutive fields. The OR gate 66 receives the NOR gate 64 response as a first of its input signals and responds to that first input signal being a ONE to signal the computer 60 that the received GCR signal with attendant ghosts generated by the accumulator 50 is useful. The NOR gate 64 response is also supplied to the computer 60. The NOR gate 64 response being a ONE signals the computer 60 to use DFT read from the memory 61 when calculating the DFT characterizing the transmission channel.

The AND gate 65 receives the contents of the shift register stage 56 and each of the plurality 63 of additional SIPO shift register stages as respective input signals. The AND gate 65 supplies a logic ONE output signal as first input signal to the OR gate 66 when and only when co-channel NTSC interference has been determined to have been significant in all of the most recent 2N consecutive fields. The NOR gate 65 receives the AND gate 65 response as a second of its input signals and responds to that second input signal being a ONE to signal the computer 60 that the received GCR signal with attendant ghosts generated by the accumulator 50 is useful. The AND gate 65 response is also supplied to the computer 60. The AND gate 65 response being a ONE signals the computer 60 to use DFT read from the memory 62 when calculating the DFT characterizing the transmission channel.

More sophisticated ways of validating the accumulator 50 output signal are possible and are accommodated by incorporating the accumulator 50 into the computer 60 together with the circuitry for deciding whether or not the received GCR signal with attendant ghosts generated by the accumulator 50 is useful. The single-bit output signal from the shift register 56 is supplied to a plurality of additional SIPO shift register stages within the computer 60. The computer 60 can be programmed to decide what value of 2N is to be used in deciding whether or not the received GCR signal with attendant ghosts generated by the accumulator 50 is useful. And the computer 60 can be further programmed to fall back to a previous accumulation result when the computer decides a current accumulation result is not useful.

FIG. 8 shows a general form the co-channel NTSC interference detector 44 can take in the DTV signal receivers of FIGS. 1 and 3. A node 440 receives input signal for the detector 44. This input signal can be equalized I-channel or Q-channel baseband signal supplied from the symbol synchronizer circuitry 16, as in the DTV signal receivers of FIGS. 1 and 3 respectively. This input signal can instead be I-channel or Q-channel baseband signal supplied without equalization from the complex demodulator 14 in a modification of the FIG. 1 or FIG. 3 DTV signal receiver. In an NTSC-rejection comb filter within the detector 44 a third delay device 441 differentially delays the input signal applied to the node 440 to generate minuend and subtrahend input signals for a digital subtractor 442. The difference output signal from the subtractor 442 is an NTSC-rejection comb filter response R in which artifacts arising from synchronous detection of the co-channel interfering analog television signal are suppressed. By way of illustration, the third delay device 441 can introduce a delay of twelve symbol epochs, 1368 symbol epochs (the duration of two NTSC video scan lines, 179,208 symbol epochs (the duration of 262 NTSC video scan lines) or 718,200 symbol epochs (the duration of two NTSC video frames). In an NTSC-selection comb filter within the detector 44 a fourth delay device 443 differentially delays the input signal applied to the node 440 to generate minuend and subtrahend input signals for a digital subtractor 444. The difference output signal from the subtractor 444 is an NTSC-selection comb filter response S in which artifacts arising from synchronous detection of the co-channel interfering analog television signal are reinforced. The fourth delay device 443 can introduce a delay of six symbol epochs, for example. A direct term of system characteristic arising from the synchronous detection of the pilot carrier is suppressed both in the NTSC-rejection comb filter response R and in the NTSC-selection comb filter response S.

The amplitude of the NTSC-rejection comb filter response R from the subtractor 442 is detected by an amplitude detector 445, and the amplitude of the NTSC-selection comb filter response S from the subtractor 444 is detected by an amplitude detector 446. An amplitude comparator 447 compares the results of amplitude detection by the amplitude detectors 445 and 446 to generate an output bit indicative of whether or not the response of the amplitude detector 446 substantially exceeds the response of the amplitude detector 445. This output bit is used for selecting between the second and third states of multiplexer 261 operation. For example, this output bit from the amplitude comparator 447 can be one of two control bits the controller 28 supplies to the multiplexer 261 in the ISI-suppression comb filter 26 of FIG. 1 or of FIG. 3. The other control bit is indicative of whether or not signal supplied from the controller 28 is to be reproduced in the multiplexer 261 response.

The amplitude detectors 445 and 446 can, by way of example, be envelope detectors with a time constant equal to several data sample intervals, so that differences in the data components of their input signals tend to average out to low value supposing these data components to be random. Amplitude differences in random noise accompanying the difference output signals of the subtractors 442 and 444 tend to average out to zero as well. Accordingly, when the amplitude comparator 447 indicates that the amplitude detection responses of amplitude detectors 445 and 446 differ more than a prescribed amount, this is also indicative that artifacts of any co-channel interfering analog television signal are above a significant level in the baseband signal supplied to node 440. This significant level corresponds to the significant level for the equalized I-channel baseband signal applied to the odd-level data slicer 22. Errors in symbol decoding done by simply data slicing the I-channel baseband signal are correctable by the trellis and Reed-Solomon error-correction coding, so long as artifacts of co-channel NTSC signal remain below this significant level.

Artifacts of co-channel NTSC interference are rejected in the comb filter response R from the subtractor 442, and artifacts of co-channel NTSC interference are selected in the comb filter response S from the subtractor 444. When the amplitude of the comb filter response S is substantially larger than the amplitude of the comb filter response R, this difference can then be presumed to be caused by the presence of artifacts of co-channel NTSC interference in the signal at node 440. The output bit supplied by the amplitude comparator 447 for this condition conditions the multiplexer 261 not to be operable in its second state, thereby deselecting the interim symbol decoding results from the odd-level data slicer 22 from appearing as final symbol decoding results from the multiplexer 261.

When the amplitude of the comb filter response S is not substantially larger than the amplitude of the comb filter response R, this lack of difference can be presumed to indicate the absence of artifacts of co-channel NTSC interference in the signal at node 440. The output bit supplied by the amplitude comparator 447 for this condition conditions the multiplexer 261 not to be operable in its third state, thereby deselecting the ISI-suppression-filtered symbol decoding results from the second linear combiner 262 from appearing as final symbol decoding results from the multiplexer 261.

FIG. 9 shows an alternative form 44' the co-channel NTSC interference detector 44 can take in the DTV signal receivers of FIGS. 1 and 3. The subtractors 442 and 444 are replaced by adders 448 and 449. This modification permits the third delay device 441' to introduce a shorter delay of six symbol epochs, for example. The fourth delay device 443' can introduce a delay of twelve symbol epochs, of 1368 symbol epochs, of 179,208 symbol epochs or of 718,200 symbol epochs, by way of example.

In the preferred embodiments of the invention described above, equalization filtering is done prior to NTSC-rejection comb filtering to facilitate selective switching between outputs from the data slicers 22 and 24 when the co-channel NTS interference fades in and fades out cyclically. Embodiments of the invention are conceivable in which equalization filtering is done after NTSC-rejection comb filtering.

The invention is usefully employed in DTV signal receivers using adaptive channel equalizers that have their filter coefficients initialized using the training signal method, but thereafter convert to a decision-feedback method for adjusting the filter coefficients. Artifacts of co-channel NTSC interference affect the decision-feedback method less than they affect the training-signal method, providing that the error signal for decision feedback is generated correctly. However, initialization of filter coefficients using the training-signal method is usually achieved in much shorter time than using the decision-feedback method, if the training-signal method is modified in accordance with the invention.

The precepts of the invention have been disclosed using symbol decoders in which decisions are made on a "hard-decision" basis relying directly on data slicer results. Other embodiments of the invention exist in which symbol decoding is performed on a "soft-decision" basis using, for example, the Viterbi algorithm. It is intended that such embodiments of the invention be included within the scope of the claims that follow.

The invention has been described with regard to the preferred embodiments in which ISI-suppression filter to compensate for the preceding effects of the NTSC-rejection comb filter succeeds the data slicer. There are embodiments of the invention in which the ISI-suppression filter to compensate for the precoding effects of the NTSC-rejection comb filter is located between the NTSC-rejection comb filter and the data slicer. These embodiments use configurations similar to that shown in FIG. 16 in the drawing of U.S. Pat. No. 5,087,975. It is intended that such embodiments of the invention be included within the scope of the claims that follow.

The invention has been described with regard to the preferred embodiments in which channel equalization filtering is done in the baseband. However, one skilled in the art of digital receiver design will be enabled upon acquaintance with the foregoing disclosure to design embodiments of the invention in which passband channel equalization filtering is done at a low intermediate frequency. It is intended that such equivalents be included within the scope of the claims which follow and that do not explicitly indicate within their respective terms that channel equalization filtering is done in the baseband.

What is claimed is:

1. A method of operating a receiver for digital television signals subject to co-channel interference from analog television signals, said method comprising the steps of:

converting said digital television signal as received to a stream of digital samples of an intermediate-frequency signal;

demodulating said stream of digital samples of an intermediate-frequency signal to generate a baseband symbol code signal accompanied at times by artifacts of interference from a co-channel analog television signal;

symbol decoding said baseband symbol code signal;

comb filtering said baseband symbol code signal for suppressing said artifacts of interference from said co-channel analog television signal in said baseband symbol code signal before said symbol decoding thereof; and channel equalization filtering said baseband symbol code signal before said symbol decoding thereof, for conforming the overall channel response resulting from said steps of comb filtering and channel equalization filtering to the comb-filter response to a match-filtered transmission channel.

2. The method of claim 1, wherein said step of channel equalization filtering is performed by an adaptive channel equalization filter provided with adjustable filter coefficients, and wherein said step of comb filtering is performed by an NTSC-rejection comb filter in cascade connection with said channel equalization filter.

3. A method of operating a receiver for digital television signals subject to co-channel interference from analog television signals, said method comprising the steps of:

demodulating a digital television signal to generate a baseband symbol code signal accompanied at times by artifacts of interference from a co-channel analog television signal;

symbol decoding said baseband symbol code signal;

comb filtering said baseband symbol code signal for suppressing said artifacts of interference from said co-channel analog television signal in said baseband symbol code signal before said symbol decoding thereof; and channel equalization filtering said baseband symbol code signal before said symbol decoding thereof, for conforming the overall channel response resulting from said steps of comb filtering and channel equalization filtering to the comb-filter response to a match-filtered transmission channel;

said step of channel equalization filtering being performed by an adaptive channel equalization filter provided with adjustable filter coefficients;

said step of comb filtering being performed by an NTSC-rejection comb filter in cascade connection with said channel equalization filter;

said step of channel equalization filtering including a routine for adjusting the adjustable filter coefficients of said adaptive channel equalization filter, said routine comprising substeps of:

extracting from said comb filter response a training signal contained within the data field synchronizing signal interposed into said baseband symbol code signal at the beginning of each data field;

accumulating training signals over an even number of data fields to generate a ghost-cancellation reference signal with attendant ghosts;

calculating the discrete Fourier transform of said ghost-cancellation reference signal with attendant ghosts;

dividing terms of said discrete Fourier transform of said ghost-cancellation reference signal with attendant ghosts by corresponding terms of a discrete Fourier transform of a match-filtered and comb-filtered ghost free ghost-cancellation reference signal supplied from memory in said receiver for digital television signals, thereby to generate the terms of a discrete Fourier transform characterizing the transmission channel; and calculating channel equalization filter coefficients from the reciprocals of the terms of said discrete Fourier transform characterizing the transmission channel for said receiver for digital television signals.

4. A method of operating a receiver for digital television signals subject to co-channel interference from analog television signals, said method comprising the steps of:

demodulating a digital television signal to generate a baseband symbol code signal accompanied at times by artifacts of interference from a co-channel analog television signal;

symbol decoding said baseband symbol code signal:

comb filtering said baseband symbol code signal for suppressing said artifacts of interference from said co-channel analog television signal in said baseband symbol code signal before said symbol decoding thereof; and channel equalization filtering said baseband symbol code signal before said symbol decoding thereof, for conforming the overall channel response resulting from said steps of comb filtering and channel equalization filtering to the comb-filter response to a match-filtered transmission channel;

said step of channel equalization filtering being performed by an adaptive channel equalization filter provided with adjustable filter coefficients;

said step of comb filtering being performed by an NTSC-rejection comb filter in cascade connection with said channel equalization filter;

said step of symbol decoding being performed by:

a data slicer responsive to the response of said cascade connection of said channel equalization filter and said comb filter for supplying a preliminary symbol decoding result; and a further comb filter responsive to said preliminary symbol decoding result for suppressing intersymbol interference introduced by said NTSC-rejection comb filter.

5. The method of claim 4, wherein said step of channel equalization filtering includes a routine for adjusting the adjustable filter coefficients of said adaptive channel equalization filter, said routine comprising substeps of:

extracting from said comb filter response a training signal contained within the data field synchronizing signal interposed into said baseband symbol code signal at the beginning of each data field;

accumulating training signals over an even number of data fields to generate a ghost-cancellation reference signal with attendant ghosts;

calculating the discrete Fourier transform of said ghost-cancellation reference signal with attendant ghosts;

dividing terms of said discrete Fourier transform of said ghost-cancellation reference signal with attendant ghosts by corresponding terms of a discrete Fourier transform of a match-filtered and comb-filtered ghost free ghost-cancellation reference signal supplied from memory in said receiver for digital television signals, thereby to generate the terms of a discrete Fourier transform characterizing the transmission channel; and calculating channel equalization filter coefficients from the reciprocals of the terms of said discrete Fourier transform characterizing the transmission channel for said receiver for digital television signals.

6. The method of claim 1, wherein said step of channel equalization filtering is performed by an adaptive channel equalization filter provided with adjustable filter coefficients, and wherein said step of comb filtering is performed by an NTSC-rejection filter in cascade connection after said channel equalization filter.

7. A method of operating a receiver for digital television signals subject to co-channel interference from analog television signals, said method comprising the steps of:
- demodulating a digital television signal to generate a baseband symbol code signal accompanied at times by artifacts of interference from a co-channel analog television signal;
- symbol decoding said baseband symbol code signal;
- comb filtering said baseband symbol code signal for suppressing said artifacts of interference from said co-channel analog television signal in said baseband symbol code signal before said symbol decoding thereof; and
- channel equalization filtering said baseband symbol code signal before said symbol decoding thereof, for conforming the overall channel response resulting from said steps of comb filtering and channel equalization filtering to the comb-filter response to a match-filtered transmission channel;
- said step of channel equalization filtering being performed by an adaptive channel equalization filter provided with adjustable filter coefficients;
- said step of comb filtering being performed by an NTSC-rejection comb filter in cascade connection after said channel equalization filter;
- said step of channel equalization filtering including a routine for adjusting the adjustable filter coefficients of said adaptive channel equalization filter, said routine comprising substeps of:
  - extracting from said comb filter response a training signal contained within the data field synchronizing signal interposed into said baseband symbol code signal at the beginning of each data field;
  - accumulating training signals over an even number of data fields to generate a ghost-cancellation reference signal with attendant ghosts;
  - calculating the discrete Fourier transform of said ghost-cancellation reference signal with attendant ghosts;
  - dividing terms of said discrete Fourier transform of said ghost-cancellation reference signal with attendant ghosts by corresponding terms of a discrete Fourier transform of a match-filtered and comb-filtered ghost free ghost-cancellation reference signal supplied from memory in said receiver for digital television signals, thereby to generate the terms of a discrete Fourier transform characterizing the transmission channel; and
  - calculating channel equalization filter coefficients from the reciprocals of the terms of said discrete Fourier transform characterizing the transmission channel for said receiver for digital television signals.

8. A method of operating a receiver for digital television signals subject to co-channel interference from analog television signals, said method comprising the steps of:
- demodulating a digital television signal to generate a baseband symbol code signal accompanied at times by artifacts of interference from a co-channel analog television signal;
- symbol decoding said baseband symbol code signal;
- comb filtering said baseband symbol code signal for suppressing said artifacts of interference from said co-channel analog television signal in said baseband symbol code signal before said symbol decoding thereof; and
- channel equalization filtering said baseband symbol code signal before said symbol decoding thereof, for conforming the overall channel response resulting from said steps of comb filtering and channel equalization filtering to the comb-filter response to a match-filtered transmission channel;
- said step of channel equalization filtering being performed by an adaptive channel equalization filter provided with adjustable filter coefficients;
- said step of comb filtering being performed by an NTSC-rejection filter in cascade connection after said channel equalization filter;
- said step of symbol decoding being performed by:
  - a data slicer responsive to the response of said cascade connection of said channel equalization filter and said comb filter for supplying a preliminary symbol decoding result; and
  - a further comb filter responsive to said preliminary symbol decoding result for suppressing intersymbol interference introduced by said NTSC-rejection comb filter.

9. The method of claim 8, wherein said step of channel equalization filtering includes a routine for adjusting the adjustable filter coefficients of said adaptive channel equalization filter, said routine comprising substeps of:
- extracting from said comb filter response a training signal contained within the data field synchronizing signal interposed into said baseband symbol code signal at the beginning of each data field;
- accumulating training signals over an even number of data fields to generate a ghost-cancellation reference signal with attendant ghosts;
- calculating the discrete Fourier transform of said ghost-cancellation reference signal with attendant ghosts;
- dividing terms of said discrete Fourier transform of said ghost-cancellation reference signal with attendant ghosts by corresponding terms of a discrete Fourier transform of a match-filtered and comb-filtered ghost free ghost-cancellation reference signal supplied from memory in said receiver for digital television signals, thereby to generate the terms of a discrete Fourier transform characterizing the transmission channel; and
- calculating channel equalization filter coefficients from the reciprocals of the terms of said discrete Fourier transform characterizing the transmission channel for said receiver for digital television signals.

10. A receiver for digital television signals subject to interference from co-channel analog television signals, said receiver comprising:
- demodulator apparatus responsive to a received one of said digital television signals for supplying a digitized baseband demodulator response comprising symbol coding accompanied by demodulation artifacts of any interference from a co-channel analog television signal;
- a cascade filter connection for supplying a cascade filter response to said digitized baseband demodulator response;
- an adaptive channel equalization filter included in said cascade filter connection and provided with adjustable filtering coefficients;
- a comb filter included in said cascade filter connection for suppressing said demodulation artifacts of interference from a co-channel analog television signal;

a symbol decoder for supplying data responsive to said cascade filter response;

an intersymbol-interference suppression filter for processing said data to compensate for the intersymbol interference introduced by said comb filter;

apparatus for extracting a received training signal from said cascade filter response during times data field synchronizing signals occur in said digital television signals; and a computer for calculating terms of a discrete Fourier transform of said training signal, generating a discrete Fourier transform characterizing the channel by dividing those terms by corresponding terms of a discrete Fourier transform of a comb-filtered and match-filtered response to ghost-free training signal as stored in memory for said computer, and calculating the adjustable filtering coefficients of said adaptive channel equalization filter for complementing the channel characterization.

11. The receiver as set forth in claim 10, wherein said channel equalization filter precedes said comb filter in said cascade filter connection.

12. The receiver as set forth in claim 10, wherein said intersymbol-interference suppression filter has an input connection receptive of decoded data from said symbol decoder.

13. A receiver for digital television signals subject to interference from co-channel analog television signals, said receiver comprising:

demodulator apparatus responsive to a received one of said digital television signals for supplying a digitized baseband demodulator response comprising symbol coding accompanied by demodulation artifacts of any interference from a co-channel analog television signal;

a co-channel interference detector for determining whether or not there is significant interference from said co-channel analog television signal;

a channel equalization filter connected to receive said digitized baseband demodulator response as its input signal and provided with adjustable filtering coefficients, said channel equalization filter for supplying a channel equalization filter response that is adaptive in response to changes in said adjustable filtering coefficients;

a comb filter connected to receive said channel equalization filter response as its input signal, for supplying a comb filter response in which said demodulation artifacts of interference from co-channel analog television signal are suppressed;

a first symbol decoder for supplying data responsive to said channel equalization response;

a second symbol decoder for supplying data responsive to said comb filter filter response;

an intersymbol-interference suppression filter for processing the data from said second symbol decoder to compensate for the intersymbol interference introduced by the comb filter;

a multiplexer for selecting data for continued processing in said receiver, said multiplexer responding to said co-channel interference detector determining there is not significant interference from said co-channel analog television signal to select for continued processing in said receiver the data from said first symbol decoder, said multiplexer responding to said co-channel interference detector determining there is significant interference from said co-channel analog television signal to select for continued processing in said receiver the data from said second symbol decoder as processed by said intersymbol-interference suppression filter to compensate for the intersymbol interference introduced by the comb filter;

apparatus for extracting a training signal received during times data field synchronizing signals occur in said digital television signals, said apparatus for extracting a training signal responding to said co-channel interference detector determining there is not significant interference from said co-channel analog television signal for extracting the received training signal from said channel equalization filter response, and said apparatus for extracting a training signal responding to said co-channel interference detector determining there is significant interference from said co-channel analog television signal for extracting the received training signal from said comb filter response; and a computer conditioned for calculating terms of a discrete Fourier transform of said received training signal, responsive to said co-channel interference detector determining there is not significant interference from said co-channel analog television signal for generating a discrete Fourier transform characterizing the channel by dividing the terms of the discrete Fourier transform of said received training signal by corresponding terms of a discrete Fourier transform of a match-filtered response to ghost-free training signal as stored in memory for said computer, responsive to said co-channel interference detector determining there is significant interference from said co-channel analog television signal for generating a discrete Fourier transform characterizing the channel by dividing the terms of the discrete Fourier transform of said received training signal by corresponding terms of a discrete Fourier transform of a comb-filtered and match-filtered response to ghost-free training signal as stored in memory for said computer, and for calculating the adjustable filtering coefficients of said adaptive channel equalization filter for complementing the channel characterization.

14. The receiver as set forth in claim 13, wherein said intersymbol-interference suppression filter has an input connection receptive of decoded data from said symbol decoder.

* * * * *